United States Patent
Irish et al.

(10) Patent No.: US 11,960,313 B2
(45) Date of Patent: Apr. 16, 2024

(54) SYSTEM AND METHOD FOR REGULATING POWER OUTPUT OF MULTIPLE SOLAR SUBSTRINGS

(71) Applicant: Optivolt Labs, Inc., Burlingame, CA (US)

(72) Inventors: Linda Stacey Irish, Burlingame, CA (US); Weston Braun, Burlingame, CA (US)

(73) Assignee: Optivolt Labs, Inc., San Mateo, CA (US)

( * ) Notice: Subject to any disclaimer, the term of this patent is extended or adjusted under 35 U.S.C. 154(b) by 0 days.

(21) Appl. No.: 18/129,321

(22) Filed: Mar. 31, 2023

(65) Prior Publication Data

US 2023/0350446 A1 Nov. 2, 2023

Related U.S. Application Data

(60) Provisional application No. 63/326,121, filed on Mar. 31, 2022.

(51) Int. Cl.
*G05F 1/67* (2006.01)
*G05F 1/70* (2006.01)

(52) U.S. Cl.
CPC . *G05F 1/67* (2013.01); *G05F 1/70* (2013.01)

(58) Field of Classification Search
CPC ..................................... G05F 1/67; G05F 1/70
See application file for complete search history.

(56) References Cited

U.S. PATENT DOCUMENTS

| | | | | |
|---|---|---|---|---|
| 6,593,520 | B2* | 7/2003 | Kondo | H02S 50/10 136/291 |
| 10,784,815 | B2 | 9/2020 | Moslehi | |
| 11,462,915 | B2* | 10/2022 | Irish | H02J 3/381 |
| 11,728,656 | B2* | 8/2023 | Irish | H02S 40/34 307/78 |
| 2012/0081933 | A1 | 4/2012 | Garrity | |
| 2013/0249319 | A1 | 9/2013 | Cummings | |

OTHER PUBLICATIONS

International Search Report and Written Opinion for International Application No. PCT/US23/17150 dated Aug. 23, 2023; 9 pages.
Notification of the International Application Number and of the International Filing Date for International Application No. PCT/US23/17150 dated Apr. 14, 2023; 1 page.

* cited by examiner

*Primary Examiner* — Adolf D Berhane
(74) *Attorney, Agent, or Firm* — Run8 Patent Group, LLC; Peter Miller; Alexander Rodriguez

(57) ABSTRACT

One variation of a system for regulating power output of multiple solar substrings includes: a set of solar substrings and a power regulator. The power regulator includes: a power supply; an adder; a modulation signal generator; a de-modulator; and an integrator. The power supply is configured to receive an input voltage from the set of solar substrings. The adder is configured to modify a voltage gain of the input voltage at the power supply. The modulation signal generator is coupled to the adder and configured to generate an oscillating power signal at the power supply. The de-modulator is configured to de-modulate the oscillating power signal output from the power supply. The first integrator: is coupled to the de-modulator and the adder; and configured to define voltage gain step at the power supply based on a DC signal component output from the de-modulator.

12 Claims, 5 Drawing Sheets

SYSTEM AND METHOD FOR REGULATING POWER OUTPUT OF MULTIPLE SOLAR SUBSTRINGS

CROSS-REFERENCE TO RELATED APPLICATIONS

This application claims the benefit of U.S. Provisional Application No. 63/326,121, filed on 31 Mar. 2022, which is hereby incorporated in its entirety by this reference.

TECHNICAL FIELD

This invention relates generally to the field of solar power systems and more specifically to a new and useful system for regulating power output of multiple solar substrings in the field of solar power systems.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1A:
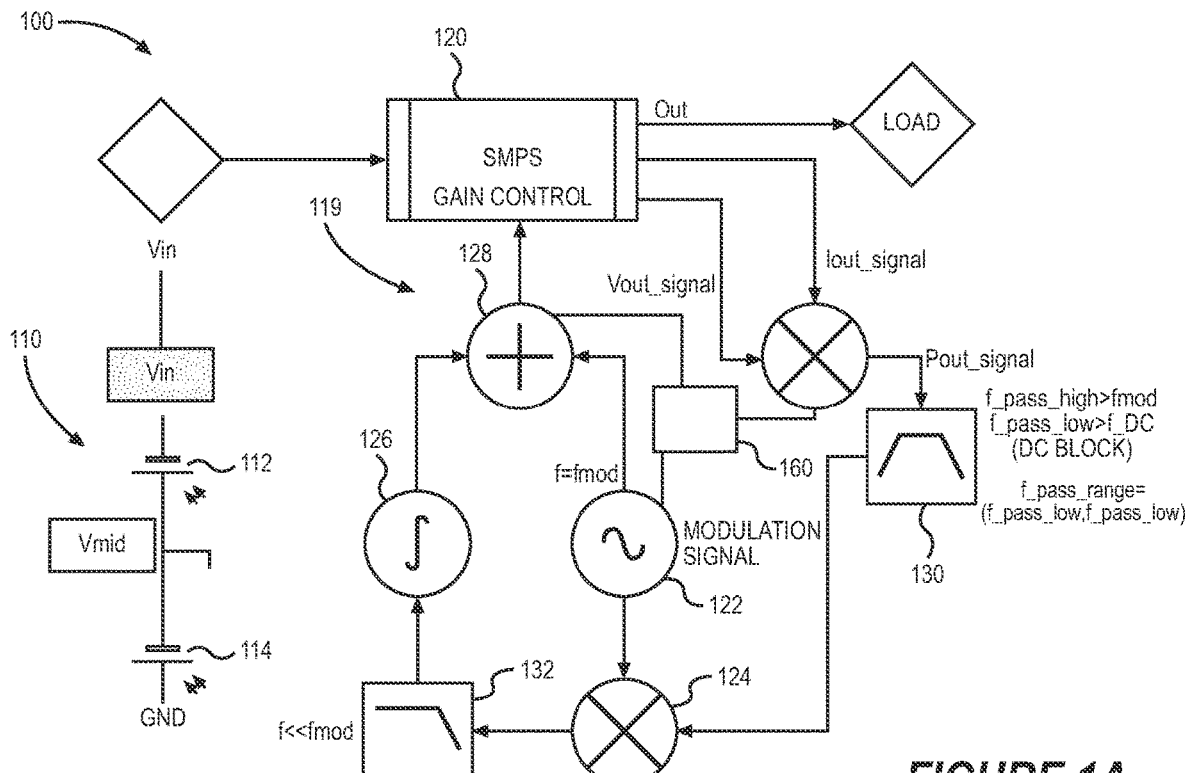
FIGS. 1A and 1B are schematic representations of the system.
Figure 1B:
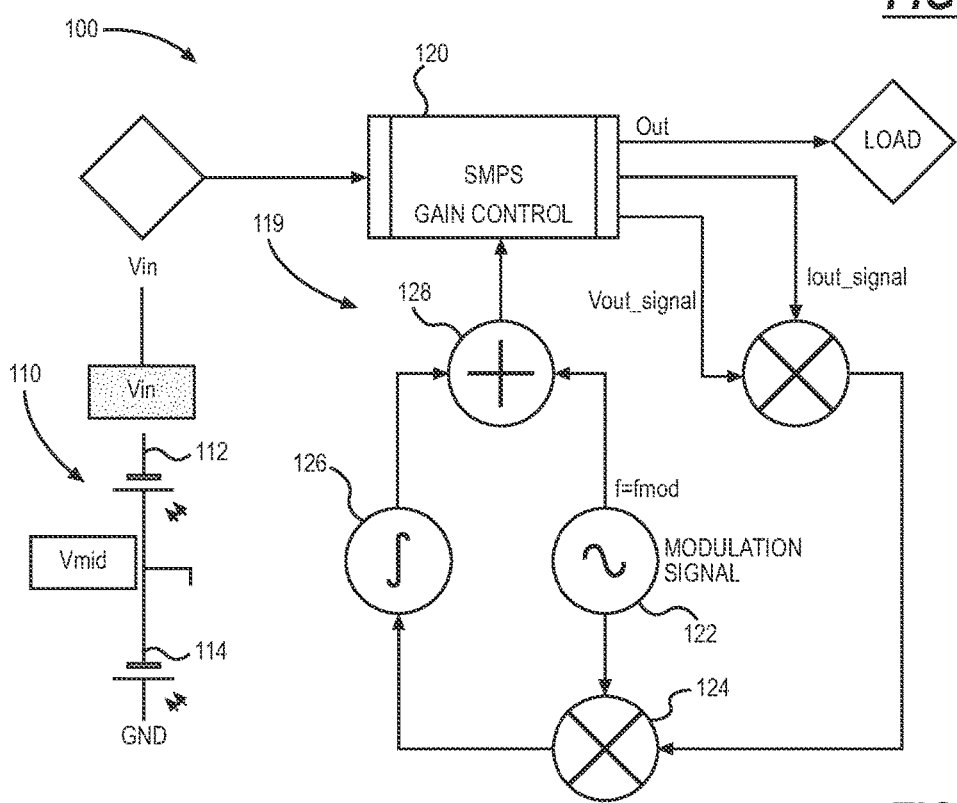

As shown in FIGS. 1A and 1B, a system 100 for regulating power output of multiple substrings includes: a first set of solar substrings 110; a first power regulator 119; and a controller 160.

The first power regulator 119 includes: a first power supply 120; a first adder 128; a first modulation signal; a first de-modulator 124; and a first integrator 126. The first power supply 120 is coupled to the first set of solar substrings no and configured to receive a first input voltage generated by the first set of solar substrings 110. The first adder 128 is coupled to a gain control of the first power supply 120 and configured to modify a voltage gain of the first input voltage. The first modulation signal generator 122 is coupled to the first adder 128 and configured to modulate the voltage gain of the first input voltage. The first de-modulator 124: is coupled to the first modulation signal generator 122 and the first power supply 120; and is configured to de-modulate voltage signals output from the first power supply 120. The first integrator 126: is coupled to the first de-modulator 124 and the first adder 128; and configured to define a voltage gain step for the first input voltage.

The controller 160 is configured to, during a first power cycle: trigger the first modulation signal generator 122 to modulate a voltage gain of the first input voltage, by a first modulation signal of a first phase and a first frequency, to induce a first oscillating power signal output from the first power supply 120; and generate a first de-modulated signal at the first de-modulator 124 based on the first oscillating power signal and the first modulation signal.

The controller 160 is also configured to, during the first power cycle: interpret a first voltage power point condition for the first input voltage based on the first de-modulated signal; and modify the voltage gain of the first power supply 120 by a first voltage gain step based on the first power point condition and in response to the first input voltage deviating from a maximum power point voltage for the first set of solar substrings 110.

Figure 2:
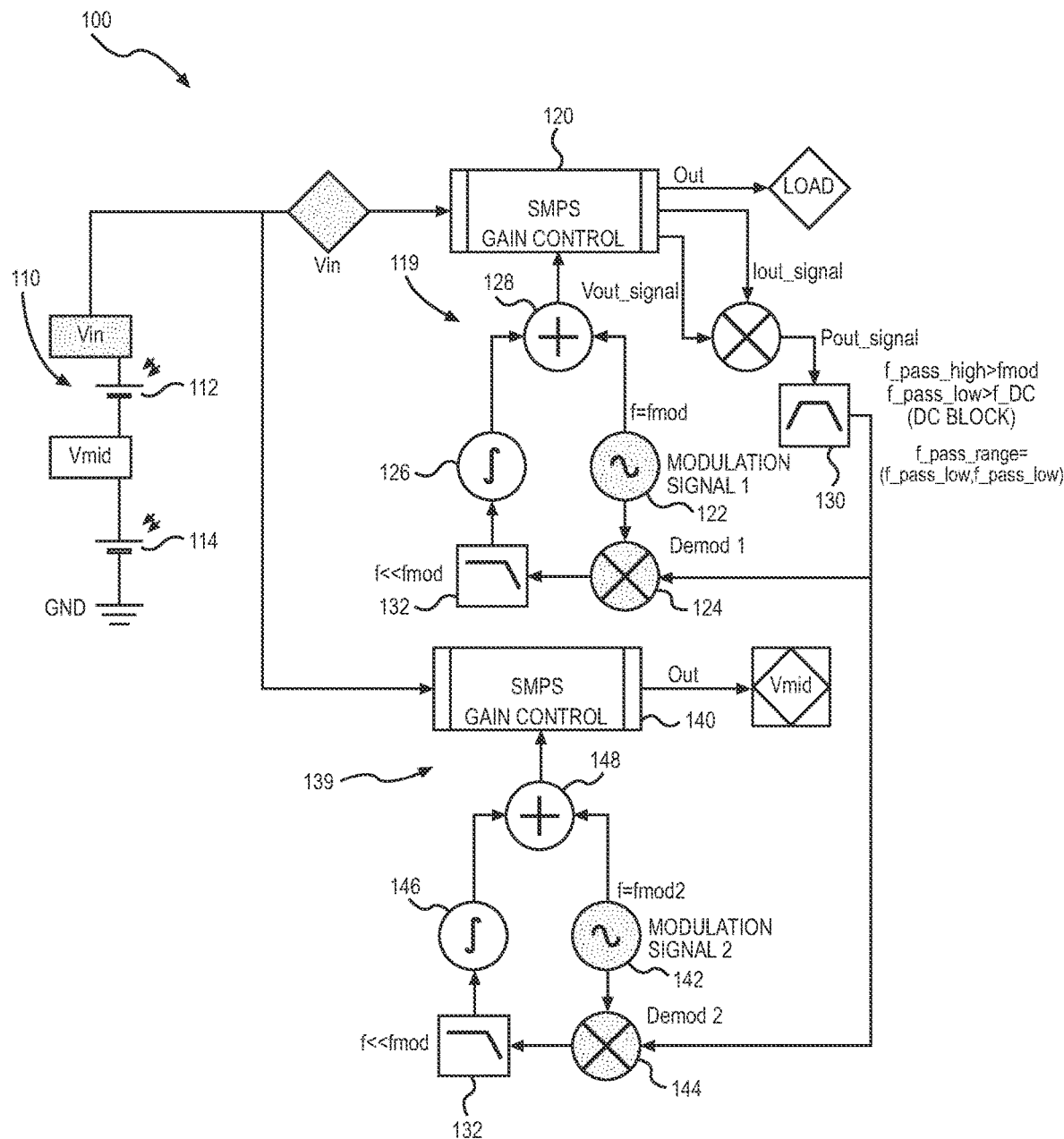
FIG. 2 is a schematic representation of one variation of the system.

In one variation of the system 100, as shown in FIG. 2, a system 100 for regulating power output of multiple substrings includes: a first set of solar substrings 110, a first power regulator 119, a second power regulator 139, and a controller 160. The first subset of solar substrings 110 includes: a first subset of solar substrings no connected to the first power regulator 119; and a second subset of solar substrings no in series with the first subset of solar substrings no and connected to the second power regulator 139. The first power regulator 119 includes: a first power supply 120 (e.g., a switch mode power supply), a first modulation signal generator 122, a first adder 128, a first de-modulator 124, and a first integrator 126. The first power supply 120 is connected to the first subset of solar substrings 110 and configured to receive a first input voltage generated by the first set of solar substrings 110. The first adder 128 is connected to a gain control of the first power supply 120 and configured to modify a voltage gain of the first input voltage at the first power supply 120. The first modulation signal generator 122 is connected to the first adder 128 and configured to modulate the voltage gain of the first input voltage received at the first power supply 120. The first de-modulator 124 is connected to the first modulation signal generator 122 and the first power supply 120. The first integrator 126 is: connected to the first de-modulator 124 and the first adder 128; and configured to define a first voltage gain step for the first input voltage at the first power supply 120. The second power regulator 139 includes: a second power supply 140, a second modulation signal generator 142, a second adder 148, a second de-modulator 144, and a second integrator 146. The second power supply 140 is connected to the second subset of solar substrings no and configured to receive the first input voltage generated by the first set of solar substrings 110. The second adder 148 is connected to a gain control of the second power supply 140 and configured to modify the voltage gain of the first input voltage at the second power supply 140. The second modulation signal generator 142 is connected to the second adder 148 and configured to modulate the voltage gain of the first input voltage received at the second power supply 140. The second de-modulator 144 is connected to the second modulation signal generator 142 and the first power supply 120. The second integrator 146 is: connected to the second de-modulator 144 and the second adder 148; and configured to define a second voltage gain step for the first input voltage at the second power supply 140. The controller 160 can then, during a first power cycle: trigger the first modulation signal generator 122 to modulate a voltage gain of the first input voltage, by a first modulation signal (e.g., sine wave, gold code, spread spectrum communication signal) of a first phase and a first frequency, to induce a first oscillating power signal from the first power supply 120; and trigger the second modulation signal generator 142 to modulate the voltage gain of the first input voltage, by a second modulation signal of a second phase and a second frequency, the second modulation signal distinct from the first modulation signal. Additionally, the controller 160 can: generate a first de-modulated signal from the first de-modulator 124 based on the first oscillating power signal from the first power supply 120 and the first modulation signal; generate a second de-modulated signal from the second de-modulator 144 based on the first oscillating power signal from the first power supply 120 and the second modulation signal; interpret a first voltage power point condition for the first input voltage based on the first de-modulated signal; and interpret a second voltage power point condition for the first input voltage based on the second de-modulated signal. Furthermore, in response to the first input voltage deviating from a maximum power point voltage, the controller 160 can: adjust the voltage gain of the first input voltage at the first power supply 120 by a first voltage gain step based on the first voltage power point condition; and adjust the voltage gain of the first input voltage at the second power supply 140 by a second voltage gain step based on the second voltage power point condition, the first power supply 120 cooperating with the second power supply 140 to output maximum power from the first set of solar substrings 110.

Figure 3:
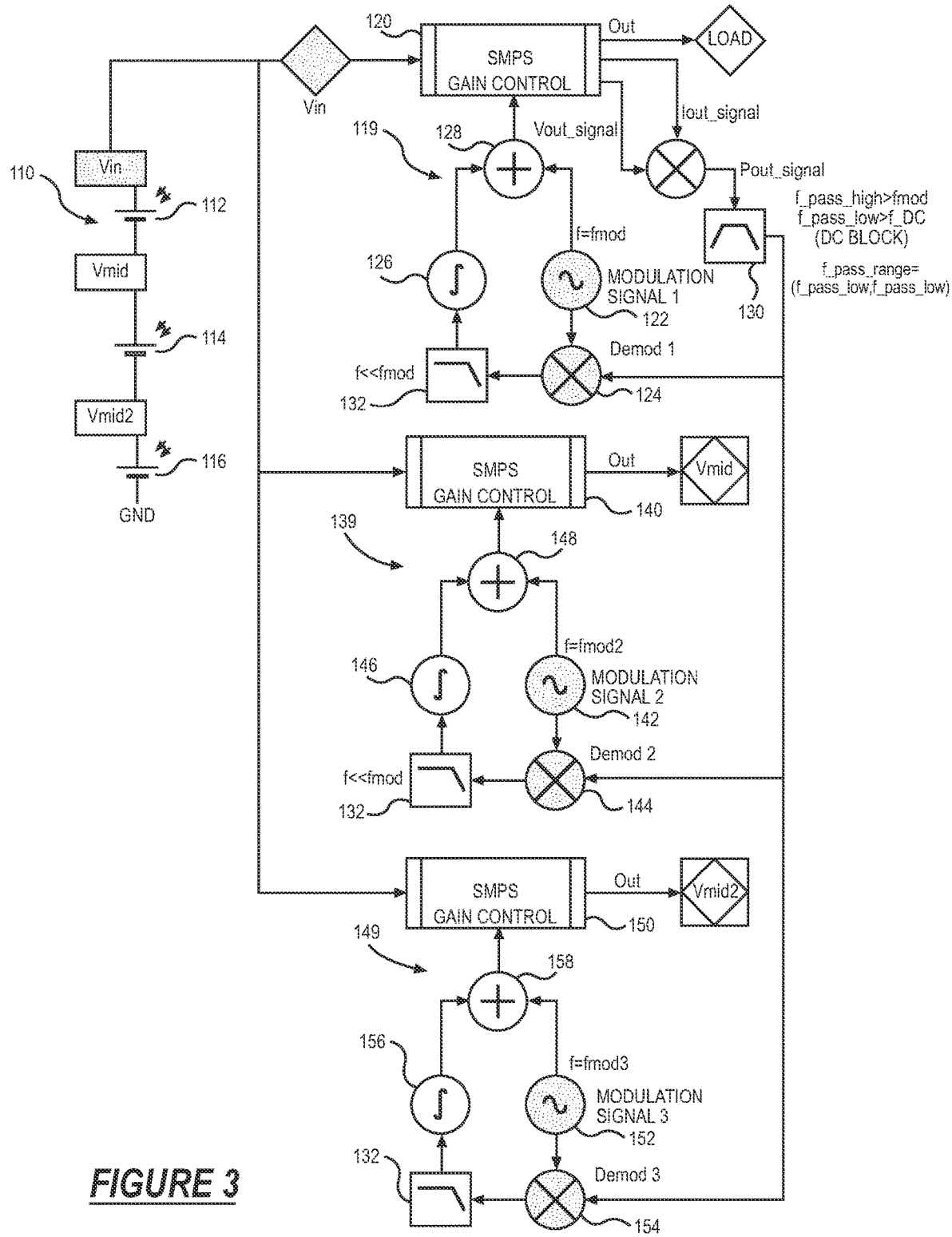
FIG. 3 is a schematic representation of one variation of the system.
Figure 4:
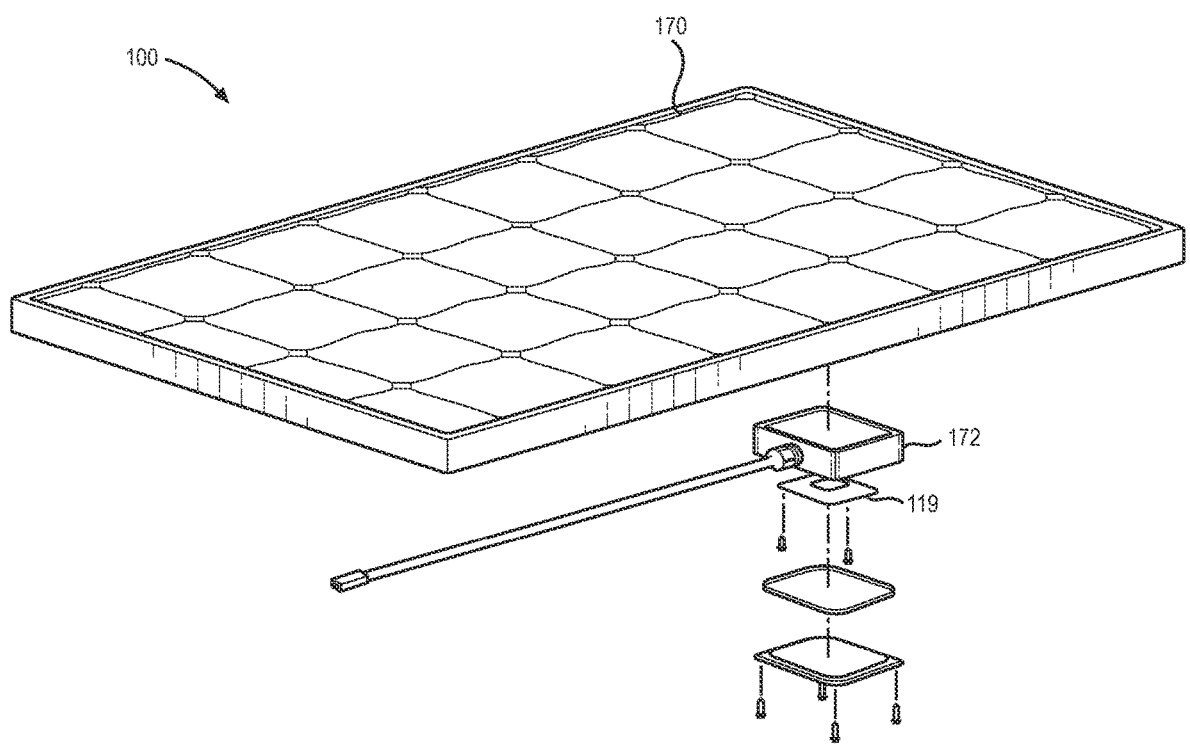
FIG. 4 is a schematic representation of one variation of the system.
Figure 5:
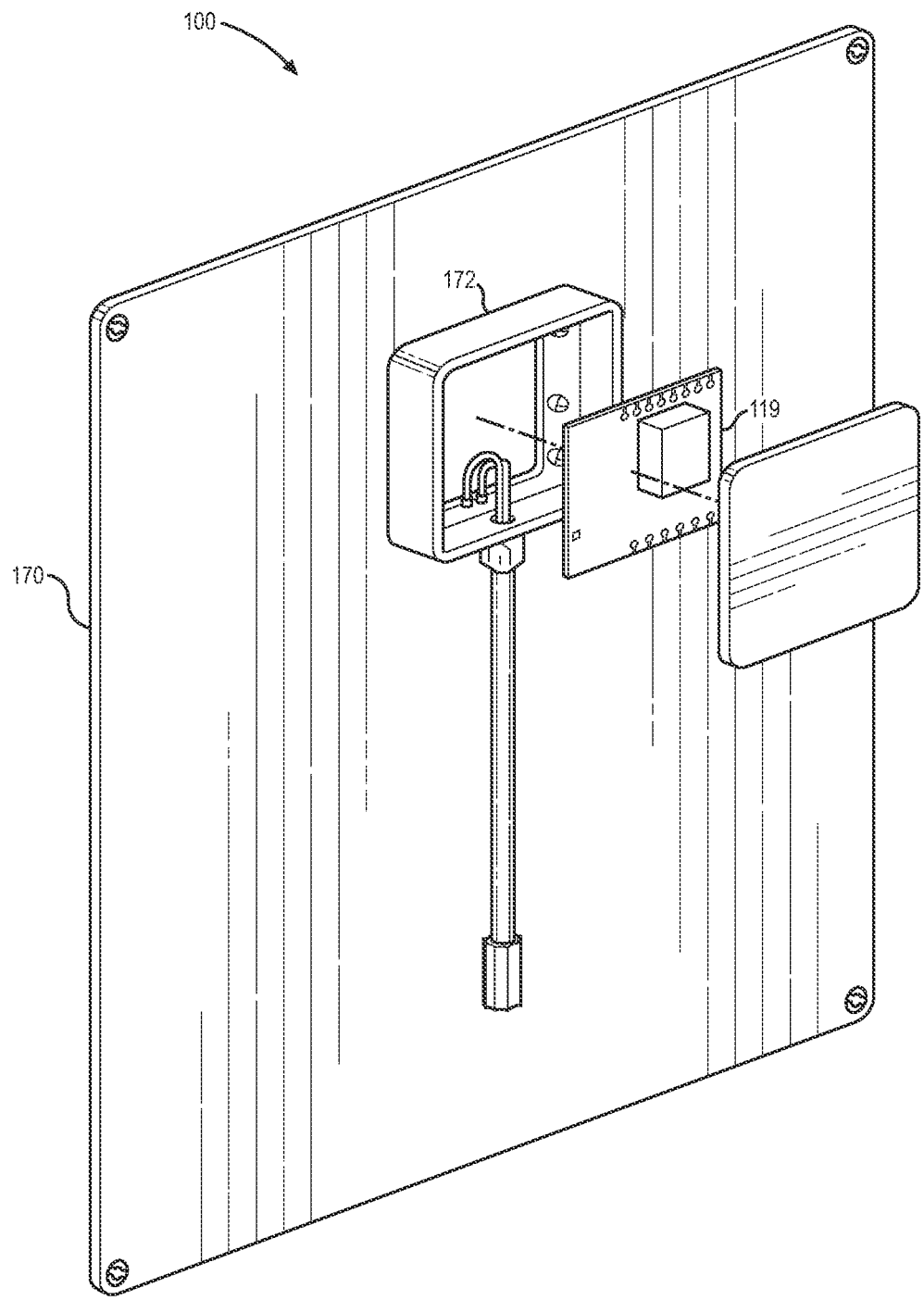
FIG. 5 is a schematic representation of one variation of the system.

In one variation of an exemplary implementation depicted in FIGS. 3 and 4, the system 100 includes a solar panel 170 including a set of solar substrings 110 and defining a front face and a rear face. The system 100 can also include: a housing structure 172 arranged on the rear face of the solar panel 170; and a rod structure extending outwardly from a side end of the housing and coupled to the solar panel 170. The housing structure 172 can include: a first power regulator 119; and a controller 160 coupled to the first power regulator 119. In the foregoing exemplary implementation, each of the first power regulator 119 and the controller 160 is enclosed within the housing structure 172.

2. Applications

Generally, the system 100 can operate as a power controller 160 configured to interface with and to balance power output by a set of solar substrings 110, which can experience uneven illumination—and therefore uneven power output—throughout operation. For the system 100 to consistently output maximum power, the set of solar substrings 110 must output the maximum power point voltage to achieve maximum power from the system 100. However, during operation of the system 100, several factors (e.g., age of the solar substrings, foreign objects covering the solar substrings, weather conditions, etc.) can result in uneven illumination for the set of solar substrings 110, which in turn deviates the output voltage of the set of solar substrings 110 from the maximum power point voltage. Therefore, the system 100 can then continuously regulate (i.e., modify gain of) the voltage output from the set of solar substrings 110 towards the maximum power point voltage in order for the system 100 to output maximum power regardless of the illumination conditions for the set of solar substrings 110.

During operation, the system 100 can output an oscillating power signal from a first power supply 120 to interpret how modifying voltage gain for an input voltage adjusts power output of the system 100. For example, the system 100 can include: a first set of solar substrings 110 configured to output a first input voltage at a first illumination condition; a first power supply 120 connected to the first set of solar substrings no and configured to receive the first input voltage output from the first set of solar substrings 110; a first modulation signal generator 122 connected to a gain control of the first power supply 120 and configured to oscillate a voltage gain of the first power supply 120; and a first de-modulator 124 connected to the first modulation signal generator 122 and the first power supply 120. The system 100 can then, during a first power cycle: trigger the first modulation signal generator 122 to modulate a voltage gain of the first power supply 120 by a first modulating signal in order to induce a first oscillating power signal output from the first power supply 120; apply the first de-modulator 124 to the first oscillating power signal output from the first power supply 120 to generate a first de-modulated signal; and interpret a voltage power point condition deviating from a maximum power point voltage for the first voltage input based on the first de-modulated signal. Therefore, the system 100 can interpret a voltage power point condition to interpret the first input voltage falling below the maximum power point voltage or above the maximum power point voltage.

Furthermore, during operation, the system 100 can then regulate the voltage input signal—and thereby power output—toward the maximum power point voltage based on the voltage power point condition interpreted from the first de-modulated signal in order to achieve maximum power output for the system 100. For example, the system 100 can include: a first integrator 126 connected to the first de-modulator 124; and a first adder 128 connected to the first modulation signal generator 122 and the first power supply 120. The system 100 can then, during the first power cycle: integrate the first de-modulated signal to define a first voltage gain step toward the maximum power output voltage for the system 100; and modify the first input voltage based on the first voltage gain step to adjust the first input voltage toward the maximum power point voltage. The system 100 can therefore, execute multiple power cycles to continuously regulate the first input voltage toward the maximum power point voltage to ensure consistent maximum power output during operation of the system 100.

3. Power Regulator

Generally, the system 100 can include: a first power supply 120 (e.g., a switch mode power supply) connected to a first set of solar substrings no and configured to receive a first input voltage output by the first set of solar substrings no; and a first modulation signal generator 122 connected to a gain control of the first power supply 120 and configured to modulate a voltage gain of the first input voltage received at the first power supply 120.

During operation of the system 100, the first set of solar substrings 110 produces a voltage that is then fed into the input of the first power supply 120 to define the input voltage of the system 100. The system 100 can then adjust voltage gain of the input voltage received at the first power supply 120 to in turn adjust power output to a load connected to the first power supply 120. Additionally, the system 100 can generate a power signal based on a voltage output and a current output from the first power supply 120. The system 100 can trigger the first modulation signal generator 122 to generate a first modulation signal of a first phase and a first frequency, the first modulation signal adjusts the gain control of the first power supply 120 to modify the input voltage at the first power supply 120. As a result, the gain control of the first power supply 120 remains in alignment with the first phase and the first frequency of the first modulation signal during operation of the system 100 (i.e., when the modulation signal increases in amplitude, the voltage gain is increased, and when the modulation signal decreases in amplitude, the voltage gain is decreased). The system 100 can then generate the power signal based on the output voltage from the first power supply 120 that is being modified by the first modulation signal. During operation of the system 100, the power signal output by the first power supply 120 will fluctuate (i.e., increase and decrease in amplitude) as the gain control of the first power supply 120 is adjusted by the first modulation signal. The system 100 can then leverage the fluctuating power signal output from the first power supply 120 in order to interpret the power output to a load deviating from a maximum power output for the system 100.

In one variation of the system 100, the power signal output from the first power supply 120 can be filtered by a band pass filter 130 in order to eliminate unwanted noise generated from the first power supply 120. The band pass filter 130 can define: a high pass cutoff frequency greater than the first frequency of the first modulation signal; and a low pass cutoff frequency configured to block a DC component of the power signal.

Generally, the system 100 can further include a first de-modulator 124 connected to the first modulation signal generator 122 and the first power supply 120 and configured to generate a first de-modulated signal. The system 100 can input the power signal output from the first power supply 120 and the first modulation signal output from the first modulation signal generator 122 through the first de-modulator 124 to then output a de-modulated signal based on the power signal and the first modulation signal.

In one variation, the first de-modulator 124 includes a multiplier circuit that is configured to apply a product operation to the power signal and the first modulation signal to then generate the de-modulated signal. In this variation, the system 100 can also include a first low pass filter 132: connected to the first de-modulator 124; defining a first cut-off frequency less than the first frequency of the first modulation signal; and configured to block an AC component of the first de-modulation signal. The system 100 can then leverage a DC component output by the first low pass filter 132 to interpret a voltage power point condition for the first input voltage. During operation of the system 100, the DC component of the de-modulated signal output from the first de-modulator 124 will be zero when the first input voltage is operating at maximum power point voltage. Thus, the system 100 can interpret a voltage power point condition for the first input voltage deviating from a maximum power point voltage in response to observing a non-zero DC component of the first de-modulated signal output from the first de-modulator 124.

Generally, the system 100 can further include: a first integrator 126 connected to the first de-modulator 124 and the first adder 128 and configured to define a voltage gain step for the first input voltage at the first power supply 120 based on the first de-modulated signal; and a first adder 128 connected to the first integrator 126 and the gain control of the first power supply 120 and configured to adjust the first input voltage based on the voltage gain step output by the first integrator 126.

During operation of the system 100, the first integrator 126 can receive the de-modulated signal output by the de-modulator and apply an integrator operation to the de-modulated signal during a power cycle. The system 100 can then define a voltage gain step based on the de-modulated signal for a first input voltage deviating from maximum power point voltage (i.e., a voltage gain step to increase the first input voltage in response to the first input voltage falling below the maximum power point voltage or a voltage gain to decrease the first input voltage in response to the first input voltage falling above the maximum power point voltage). The system 100 can then apply the voltage step gain defined by the first integrator 126 to the gain control of the first power supply 120 via the first adder 128 to adjust the first input voltage toward the maximum power point voltage. Thus, during operation, the system 100 can execute multiple power cycles to adjust the first input voltage until the maximum power point voltage is achieved and the system 100 is operating at maximum power output.

3.1 Power Regulator: Increasing Voltage Gain

In one implementation, the system 100 can interpret a voltage power point condition for the first input voltage when the first input voltage received at the first power supply 120 falls below the maximum power point voltage. During operation of the system 100 at this particular voltage condition, the oscillating power signal output from the first power supply 120 will mirror the first phase and first frequency of the first modulation signal (i.e., as the modulation signal increases in amplitude, the magnitude of the power signal will increase; and as the modulation signal decreases in amplitude, the magnitude of the power signal will decrease). As a result, the first de-modulation signal output from the first de-modulator 124 will always be a positive oscillating signal during operation of the system 100 at this particular voltage condition. In one variation, the low pass filter 132 is applied to the positive oscillating signal received from the first de-modulator 124 to block the AC component of the signal, which results in a positive DC signal component. In response to interpreting the positive DC signal component, the system 100 can then apply a positive voltage step gain to the gain control of the first power supply 120 to adjust the first input voltage upward toward the maximum power point voltage during a first power cycle. If the system 100 interprets the adjusted input voltage as falling below the maximum power point voltage following the first power cycle, the system 100 can continue to apply a positive voltage step for subsequent power cycles until the maximum power point voltage is achieved.

For example, the system 100 can, during a first power cycle: trigger the first modulation signal generator 122 to modulate a voltage gain of the first input voltage, by a first modulation signal (e.g., sine wave, gold code, spread spectrum communication signal) of a first phase and a first frequency, to induce a first oscillating power signal from the first power supply 120; generate a first de-modulated signal from the first de-modulator 124 based on a product of the first oscillating power signal from the first power supply 120 and the first modulation signal; apply a first lowpass filter to the first de-modulated signal to isolate a first DC component of the first de-modulated signal; interpret the first input voltage falling below the maximum power point voltage in response to detecting a positive value for the first DC component of the first de-modulated signal; apply the first integrator 126 to the first DC component to define a voltage gain step increase for the first input voltage; and increase the voltage gain at the first power supply 120 for the first input voltage by the voltage gain step increase toward a maximum power point voltage for the first set of solar strings.

In another example, the system 100 can: generate a first de-modulated power signal based on a product of the first oscillating power signal from the first power supply 120 and the first modulation signal; extract a DC component from the first de-modulated power signal; and interpret the first input voltage falling below the maximum power point voltage in response to detecting a positive value for the first DC component of the first de-modulated power signal. In this example, the de-modulated power signal includes an AC component and a positive DC component as a result of the first oscillating power signal being proportional with the first modulation signal. Thus, the system 100 can then: apply the first integrator 126 to the positive DC component to define a positive voltage gain step for the first input voltage; and trigger the first adder 128 to apply the positive voltage gain step at the gain control for the first power supply 120 to increase the first input voltage toward the maximum power point voltage.

In the aforementioned example, the first modulation signal generator 122 can be configured to output a first modulation signal defining a first sine wave and configured to induce output of a first sinusoidal power signal, at the first phase and the first frequency, from the first power supply 120. Thus, the system 100 can then, generate the first de-modulated power signal based on a product of the first sinusoidal power signal from the first power supply 120 and the sine wave. In this example, the first de-modulated power signal will include a DC component and AC component according to the sine squared identity. The system 100 can then isolate this DC component from the first de-modulated power signal, such as by a low pass filter 132, in order to: interpret the first input voltage falling below the maximum power point voltage; and interpret the positive voltage gain step applied to the gain control of the first power supply 120.

3.2 Power Regulator: Decreasing Voltage Gain

In one implementation, the system 100 can interpret a voltage power point condition for the first input voltage when the first input voltage received at the first power supply 120 falls above the maximum power point voltage. During operation of the system 100 at this particular voltage condition, the oscillating power signal output from the first power supply 120 will mirror the first frequency of the first modulation signal. However, the oscillating power signal will not mirror the first phase of the first modulation signal (i.e., as the modulation signal increases in amplitude, the magnitude of the power signal will decrease; and as the modulation signal decreases in amplitude, the magnitude of the power signal will increase). As a result, the first de-modulation signal output from the first de-modulator 124 will always be a negative oscillating signal during operation of the system 100 at this particular voltage condition. In one variation, the low pass filter 132 is applied to the negative oscillating signal received from the first de-modulator 124 to block the AC component of the signal which results in a negative DC signal component. In response to interpreting the negative DC signal component, the system 100 can then apply a negative voltage step gain to the gain control of the first power supply 120 to adjust the first input voltage downward toward the maximum power point voltage during a first power cycle. If the system 100 interprets the adjusted input voltage as falling above the maximum power point voltage following the first power cycle, the system 100 can continue to apply a negative voltage step for subsequent power cycles until the maximum power point voltage is achieved. Alternatively, if the system 100 interprets the adjusted input voltage as falling below the maximum power point voltage following the first power cycle, the system 100 can then apply a positive voltage step for subsequent power cycles until the maximum power point voltage is achieved.

For example, the system 100 can, during a first power cycle: trigger the first modulation signal generator 122 to modulate a voltage gain of the first input voltage, by a first modulation signal (e.g., sine wave, gold code, spread spectrum communication signal) of a first phase and a first frequency, to induce a first oscillating power signal from the first power supply 120; generate a first de-modulated signal from the first de-modulator 124 based on a product of the first oscillating power signal from the first power supply 120 and the first modulation signal; apply a first lowpass filter to the first de-modulated signal to isolate a first DC component of the first de-modulated signal; interpret the first input voltage falling above the maximum power point voltage in response to detecting a negative value for the first DC component of the first de-modulated signal; apply the first integrator 126 to the first DC component to define a voltage gain step decrease for the first input voltage; and attenuate the voltage gain at the first power supply 120 for the first input voltage by the voltage gain step decrease toward a maximum power point voltage for the first set of solar strings.

In another example, the system 100 can: generate a first de-modulated power signal based on a product of the first oscillating power signal from the first power supply 120 and the first modulation signal; extract a DC component from the first de-modulated power signal; and interpret the first input voltage above the maximum power point voltage in response to detecting a negative value for the first DC component of the first de-modulated power signal. In this example, the de-modulated power signal includes an AC component and a negative DC component as a result of the first oscillating power signal being inversely proportional with the first modulation signal. Thus, the system 100 can then: apply the first integrator 126 to the negative DC component to define a negative voltage gain step for the first input voltage; and trigger the first adder 128 to apply the negative voltage gain step at the gain control for the first power supply 120 to decrease the first input voltage toward the maximum power point voltage.

3.3 Power Regulator: Maximum Power Point Voltage

In one implementation, the system 100 can interpret a voltage power point condition for the first input voltage when the first input voltage received at the first power supply 120 is at the maximum power point voltage. During operation of the system 100 at this particular voltage condition, the oscillating power signal output from the first power supply 120 will not mirror the first phase nor first frequency of the first modulation signal. (i.e., as the modulation signal increases in amplitude, the magnitude of the power signal will decrease; and as the modulation signal decreases in amplitude, the magnitude of the power signal will decrease). As a result, the first de-modulation signal output from the first de-modulator 124 will always be oscillating at a frequency greater than the first frequency for the first modulation signal during operation of the system 100 at this particular voltage condition. In one variation, the low pass filter 132 defining the cutoff frequency less than the first frequency of the first modulation signal is applied to the oscillating signal received from the first de-modulator 124 to block the AC component of the signal, which results in a zero DC signal component. In response to interpreting the zero DC signal component, the system 100 can then apply a null voltage step gain to the gain control of the first power supply 120 to maintain the first input voltage at the maximum power point voltage during a first power cycle. Alternatively, if the system 100 interprets the first input voltage as falling above or below the maximum power point voltage following the first power cycle (e.g., the system 100 experiences a change in the illumination condition for the set of solar substrings 110), the system 100 can then apply voltage steps for subsequent power cycles until the maximum power point voltage is achieved.

For example, the system 100 can, during a first power cycle: trigger the first modulation signal generator 122 to modulate a voltage gain of the first input voltage, by a first modulation signal (e.g., sine wave, gold code, spread spectrum communication signal) of a first phase and a first frequency, to induce a first oscillating power signal from the first power supply 120; generate a first de-modulated signal from the first de-modulator 124 based on a product of the first oscillating power signal from the first power supply 120 and the first modulation signal; apply a first lowpass filter to the first de-modulated signal to isolate a first DC component of the first de-modulated signal; interpret the first input voltage matching the maximum power point voltage in response to detecting absence of the first DC component for the first de-modulated signal; apply the first integrator 126 to the first DC component to define a null voltage gain step for the first input voltage; and retain the voltage gain at the first power supply 120 for the first input voltage to maintain a maximum power point voltage for the first set of solar strings.

In another example, the system 100 can: generate a first de-modulated power signal based on a product of the first oscillating power signal from the first power supply 120 and the first modulation signal; and interpret the first input voltage matching the maximum power point voltage in response to detecting absence of a DC component in the first de-modulated power signal. In this example, the oscillating power signal output from the first power supply 120 will not mirror the first phase nor first frequency of the first modulation signal resulting in the absence of the DC component in the first de-modulated power signal. Thus, the system 100 can then trigger the first adder 128 to apply a null voltage gain step at the gain control for the first power supply 120 in response to the first input voltage matching the maximum power point voltage.

In the aforementioned example, since maximum power point voltage is achieved for the output of the first power regulator 119, the gain control of the first power supply 120 does not need further adjustment. However, during operation of the system 100, environmental conditions (e.g., weather patterns) may result in uneven illumination across the set of solar substrings 110, which in turn will affect the power output from the first power regulator 119. Thus, the system 100 can continue to execute power cycles at the power regulator in order to ensure that the voltage output is maintained at the maximum power point voltage. For example, in response to achieving the maximum power point voltage, the system 100 can then initiate a low power mode to reduce the number of power cycles executed at the power regulator. Subsequently, in response to identifying a deviation of the voltage output from the maximum power point voltage, the system 100 can then terminate the low power mode and initiate a sequence of power cycles until the maximum power point voltage is achieved from the set of solar substrings 110.

4. Two-Stage Power Regulator

In one implementation, as shown in FIG. 2, the system 100 includes: a first set of solar substrings no including a first subset of solar substrings 110 in series with a second subset of solar substrings 110; a first power regulator 119; and a second power regulator 139. In this implementation, the first power regulator 119 is connected to the first subset of solar substrings no and configured to regulate a first voltage output from the first subset of solar substrings no. Additionally, the second power regulator 139 is: connected to the second subset of solar substrings no at a mid-point between the first subset of solar substrings no and the second subset of solar substrings no; and configured to regulate a second voltage output from the second subset of solar substrings no. The system 100 can then regulate the first voltage and the second voltage in order to achieve a maximum power point voltage—and therefore a maximum power output—for the first set of solar substrings no.

In this implementation, the system 100 includes the first set of solar substrings no including a first solar substring 112 and a second solar substring 114 arranged in series. The system 100 also includes the first power regulator 119 coupled to the voltage output from the first solar substring 112. The second power regulator 139 defines: an output coupled to a midpoint voltage between the first solar substring 112 and the second solar substring 114; and an input coupled to the voltage output of the first solar substring 112.

Furthermore, the second power regulator 139 includes: a second power supply 140; a second modulation signal generator 142; a second de-modulator 144; and a second integrator 146. The second power supply 140 is configured to receive the first input voltage generated at the second of solar substrings. The second modulation signal generator 142: is coupled to a second gain control of the second power supply 140; generates a second modulation signal of a second phase and a second frequency—different from the first phase and the first frequency—of the first modulation signal; and is configured to induce a second oscillating power signal output from the second power supply 140. The second de-modulator 144: is coupled to the second modulation signal generator 142 and the first power supply 120; and configured to generate a second de-modulated power signal based on the first oscillating power signal and the first modulation signal. The second integrator 146: is coupled to the second gain control of the second power supply 140 and the second de-modulator 144; and defines a second voltage gain step for the voltage midpoint based on the second de-modulated power signal.

Environmental conditions (e.g., weather patterns) can result in uneven illumination across the first solar substring 112 and the second solar substring 114. Thus, in the aforementioned implementation, the system 100 can: modify a voltage output from the set of solar substrings 110; and modify an input voltage at a midpoint between the set of solar substrings 110 in order to balance voltage output across the set of solar substrings 110. In this implementation, the system 100 can execute power cycles, as described above, for the first power regulator 119 and the second power regulator 139 to modify the gain controls in order to achieve the maximum power point voltage from the set of solar substrings 110. Upon achieving maximum power point voltage, the midpoint voltage between the first solar substring 112 and the second solar substring 114 should match half the value of the total voltage output from the set of solar substrings 110.

In this implementation, it is desirable for the system 100 to generate different and distinct modulation signals (e.g., modulation signals of distinct frequencies, modulation signals of distinct spread spectrum communication signals) for the first power regulator 119 and the second power regulator 139 in order to prevent interference between the power regulators.

In one example, the first modulation signal generator 122 outputs a first modulation signal defining a first sine wave and configured to induce output of a first sinusoidal power signal from the first power supply 120. In this example, the first sinusoidal power signal includes the first phase and the first frequency of the first sine wave. Additionally, the second modulation signal generator 142: outputs a second modulation signal defining a second sine wave of a second frequency offset (e.g., 20 Hertz offset) from the first frequency; and configured to induce output of a second sinusoidal power signal, at the second phase and the second frequency, from the second power supply 140. Thus, the system 100 can execute a sequence of power cycles across the first power regulator 119 and the second power regulator 139 in order to achieve the maximum power point voltage from the set of solar substrings 110.

During operation, the system 100 can experience uneven illumination between the first subset of solar substrings no and the second subset of solar substrings no. In one variation, the first voltage output by the first subset of solar substrings no is operating below a maximum power point voltage and the second voltage output by the second subset of solar substrings 110 is operating above the maximum power point voltage. The system 100 can then: regulate a first voltage gain for a first power supply 120 to increase the first voltage; and regulate a second voltage gain for a second power supply 140 to decrease the second voltage and therefore achieve maximum power point voltage for the first set of solar substrings 110.

For example, during a first power cycle the system 100 can: trigger a first modulation signal generator 122 to modulate a first voltage gain of a first voltage, by a first modulation signal (e.g., sine wave, gold code, spread spectrum communication signal) of a first phase and a first frequency, to induce a first oscillating power signal from a first power supply 120; and trigger a second modulation signal generator 142 to modulate a second voltage gain of a second voltage, by a second modulation signal (e.g., sine wave, gold code, spread spectrum communication signal) of a second phase and a second frequency, the second modulation signal distinct from the first modulation signal. Additionally, the system 100 can, during the first power cycle: generate a first de-modulated signal from a first de-modulator 124 based on a product of the first oscillating power signal from the first power supply 120 and the first modulation signal; generate a second de-modulated signal from a second de-modulator 144 based on a product of the first oscillating power signal from the first power supply 120 and the second modulation signal; apply a first lowpass filter to the first de-modulated signal to isolate a first DC component of the first de-modulated signal; and apply a second lowpass filter to the second de-modulated signal to isolate a second DC component of the second de-modulated signal. Furthermore, the system 100 can, during the first power cycle: interpret the first voltage falling below the maximum power point voltage in response to detecting a positive value for the first DC component of the first de-modulated signal; interpret the second voltage falling above the maximum power point voltage in response to detecting a negative value for the second DC component of the second de-modulated signal; increase the first voltage gain at the first power supply 120 for the first voltage by a voltage gain step increase; and decrease the second voltage gain at the second power supply 140 for the second voltage by a voltage gain step decrease, the first voltage gain cooperating with the second voltage gain to achieve maximum power point voltage for the first set of solar substrings 110.

4.1 Maximum Power Point Voltage Deviation

In one implementation, the system 100 can: interpret the output voltage from the set of solar substrings 110 as deviating from the maximum power point voltage; and interpret the midpoint voltage between the first solar substring 112 and the second solar substring 114 as deviating from the maximum power point voltage. Thus, the system 100 can execute power cycles, as described above, in order to balance voltage output across the set of solar substrings 110 to achieve the maximum power point voltage.

For example, the system 100 can, during the first power cycle: generate a first de-modulated power signal based on a product of the first oscillating power signal from the first power supply 120 and the first modulation signal; and extract a first DC component from the first de-modulated power signal. In this example, the first solar substring 112 can output a voltage output less than the maximum power point voltage as a result of environmental conditions (e.g., weather). Thus, the system 100 can then: interpret the first input voltage falling below the maximum power point voltage in response to detecting a positive value for the first DC component in the first de-modulated power signal; and trigger the first adder 128 to apply a positive voltage gain step at the gain control for the first power supply 120 to increase the first input voltage toward the maximum power point voltage in response to interpreting the first input voltage falling below the maximum power point voltage.

The system 100 can then—sequentially or synchronously—with the first power cycle: generate a second de-modulated power signal based on a product of the first oscillating power signal from the first power supply 120 and the second modulation signal; and extract a second DC component from the second de-modulated power signal. In this example, the system 100 can then: interpret the first input voltage above the maximum power point voltage in response to detecting a negative value for the first DC component in the second de-modulated power signal; and trigger the second adder 148 to apply a negative voltage gain step at the gain control for the second power supply 140 to decrease the midpoint voltage in response to interpreting the first input voltage falling below the maximum power point voltage.

Thus, the system 100 can modify voltage outputs across multiple voltage points across the set of solar substrings 110 to achieve a maximum power point voltage output from the set of solar substrings 110 regardless of the environmental conditions (e.g., weather) obstructing the set of solar substrings 110.

4.2 Achieving Maximum Power Point Voltage

In one implementation, the system 100 can: interpret the output voltage from the set of solar substrings 110 as deviating from the maximum power point voltage; and interpret the midpoint voltage between the first solar substring 112 and the second solar substring 114 as matching the maximum power point voltage. Thus, the system 100 can execute power cycles as described above, to modify the voltage output from the first solar substring 112 in order to achieve the maximum power point voltage.

For example, the system 100 can, during the first power cycle: generate a first de-modulated power signal based on a product of the first oscillating power signal from the first power supply 120 and the first modulation signal; and extract a first DC component from the first de-modulated power signal. In this example, the system 100 can then: interpret the first input voltage above the maximum power point voltage in response to detecting a negative value for the first DC component in the first de-modulated power signal; and trigger the first adder 128 to apply a negative voltage gain step at the gain control for the first power supply 120 to decrease the first input voltage toward the maximum power point voltage in response to interpreting the first input voltage falling below the maximum power point voltage.

The system 100 can then—sequentially or synchronously—with the first power cycle: generate a second de-modulated power signal based on a product of the first oscillating power signal from the first power supply 120 and the second modulation signal; and interpret the first input voltage matching the maximum power point voltage in response to detecting absence of a second DC component in the second de-modulated power signal. Thus, the system 100 can trigger the second adder 148 to apply a null voltage gain step at the second gain control for the second power supply 140 in response to the first input voltage matching the maximum power point voltage.

Therefore, upon achieving maximum power point voltage at the output voltage from the set of solar substrings 110, the system 100 can: maintain the maximum power point voltage at the first power regulator 119 and the second power regulator 139; and, in response to detecting variations from the maximum power point voltage, initiate power cycles as described above to balance voltage output across the set of solar substrings 110.

5. Three-Stage Power Regulator

In one implementation, the system 100 includes a third power regulator 149: connected to the set of solar substrings 110; and configured to regulate voltage output across three voltage points in the set of solar substrings 110. In this implementation the first set of solar substrings includes a first solar substring 112, a second solar substring 114, and a third solar substring 116 arranged in series to each other. The third power regulator 149 defines: an output coupled to a second midpoint voltage between the second solar substring 114 and the third solar substring 116; and an input coupled to the voltage output of the first solar substring 112.

The third power regulator 149 includes: a third power supply 150; a third modulation signal generator 152; a third de-modulator 154; and a third integrator 156. The third power supply 150 is configured to receive the first input voltage generated by the set of solar substrings 110. The third modulation signal generator 152: is coupled to a third gain control of the third power supply 150; generates a third modulation signal of a third phase and a third frequency different from the second phase and the second frequency of the second modulation signal; and is configured to induce a third oscillating power signal output from the third power supply 150. The third de-modulator 154: is coupled to the third modulation signal generator 152 and the first power supply 120; and configured to generate a third de-modulated power signal based on the first oscillating power signal and the third modulation signal. The third integrator 156: is coupled to the third gain control of the third power supply 150 and the third de-modulator 154; and defines a third voltage gain step for the second voltage midpoint based on the third de-modulated power signal. Additionally or alternatively, the system 100 can include a third adder 158: coupled to the third modulation signal generator 152 and the third integrator 156; and configured to modify the third gain control of the third power supply 150.

Thus, as described above, the system 100 can—sequentially or synchronously—execute power cycles across the first power regulator 119, the second power regulator 139 and the third power regulator 149 in order to achieve the maximum power point voltage output from the set of solar substrings 110.

6. Multi-Stage Power Regulator

In one implementation, the system 100 can include: a set of solar substrings no defining a predefined (e.g., more than two) subset of solar substrings no; and a set of power regulators configured to regulate voltage gain at a set of voltage points for each subset of solar substrings no in the set of solar substrings 110. During operation, the system 100 can, modify gain controls of a set of power supplies corresponding to each of the set of voltage points using the structure and techniques described above to achieve maximum power point voltage—and therefore maximum power output—for the set of solar substrings no.

7. Example: Roof Solar Panels

Generally, a set of solar substrings no can exhibit non-uniform power output over time due to changes in solar illumination, shading, and local reflectance (hereinafter "illumination"). Illumination profiles of groups of solar substrings can also vary greatly across different geographic locations and different solar substring installation orientations. For example, a group of solar substrings can be installed on a flat roof, across multiple non-parallel facets of a pitched roof, on a roof of a passenger vehicle, or in an open field. The set of solar substrings 110 can therefore be exposed to significantly different illumination profiles over time, and solar substrings in the set of solar substrings 110 can be illuminated and shaded differently and can therefore output significantly different power magnitudes at any given time. In another example, the system 100 includes a solar panel 170: arranged on a roof; including the set of solar substrings no; and defining a front face and a rear face. In this example, the system 100 further includes a housing: arranged on the rear face of the solar panel 170; and including the first power regulator 119 and the controller 160 arranged within a cavity of the housing.

The system 100 can therefore include the power regulator configured to condition and merge outputs of the sets of solar substrings—which can be nearly identical (e.g., 300 Watts each) within certain daily time windings (e.g., midday) and very different (e.g., between 50 Watts and 500 Watts) at other times of day (e.g., early afternoon)—into one common higher-voltage, higher-current output.

For example, for a solar installation containing multiple sets of solar substrings arranged on different facets of a pitched roof, an east-facing solar substring in the solar installation can receive predominant illumination, the south-facing solar substring in the solar installation can receive some illumination, and the west-facing solar substring in the solar installation can receive minimal illumination (e.g., from reflection) from sunrise through mid-morning (e.g., SAM until 10 AM). Therefore, in this example: the east-facing solar substring can generate a peak of 200 Watts of power at an average operating voltage of 1.12 Volts during this morning period; the south-facing solar substring can generate an average of 50 Watts and a peak of 200 Watts of power at an average operating voltage of 1.09 Volts during this morning period; and the west-facing solar substring can generate an average of 5 Watts and a peak of 20 Watts of power at an average operating voltage of 1.0 Volt during this morning period if the sets solar substrings are disconnected and operated independently.

In the foregoing example, the east-facing solar substring can receive some illumination (e.g., from both reflection and direct illumination), the south-facing solar substring can receive predominant illumination, and the west-facing solar substring can receive some illumination from mid-morning to mid-afternoon (e.g., 10 AM until 3 PM). Therefore, the east-facing solar substring can generate an average of 150 Watts and a peak of 300 Watts of power at an average operating voltage of 1.15 Volts during this midday period; the south-facing solar substring can generate an average of 300 Watts and a peak of 350 Watts of power at an average operating voltage of 1.2 Volts during this midday period; and the west-facing solar substring can generate an average of 150 Watts and a peak of 300 Watts of power at an average operating voltage of 1.15 Volts during this midday period if the sets solar substrings are disconnected and operated independently.

Furthermore, in this example, the east-facing solar substring can receive minimal illumination (e.g., from reflection), the south-facing solar substring can receive some illumination, and the west-facing solar substring can receive predominant illumination from mid-afternoon to dusk (e.g., 3 PM until 8 PM). Therefore, in this example: the east-facing solar substring can generate an average of 5 Watts and a peak of 20 Watts of power at an average operating voltage of 1.0 Volt during this evening period; the south-facing solar substring can generate an average of 50 Watts and a peak of 200 Watts of power at an average operating voltage of 1.09 Volts during this evening period; and the west-facing solar substring can generate a peak of 200 Watts of power at an average operating voltage of 1.12 Volts during this evening period.

Therefore, the effective operating voltage and power output of the east-, south-, and west-facing solar substrings can vary significantly over time during a single day and can differ significantly between solar substrings (e.g., by up to 200 Watts and 0.2 Volts between two solar substrings at any single instant in time). Furthermore, differences in output power and current from these solar substrings under uneven illumination can significantly reduce total power output of the set of solar substrings 110 arranged in series. Accordingly, the system 100 can: include a set of power regulators coupled to the sets of solar substrings arranged across the roof; and execute power cycles, as described above to achieve uniform voltage output from the sets of solar substrings.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A system for regulating power output of multiple solar substrings comprising:
   a first set of solar substrings;
   a first power regulator comprising:
      a first power supply coupled to the first set of solar substrings and configured to receive a first input voltage generated by the first set of solar substrings;
      a first adder coupled to a gain control of the first power supply and configured to modify a voltage gain of the first input voltage;
      a first modulation signal generator coupled to the first adder and configured to modulate the voltage gain of the first input voltage;
      a first de-modulator coupled to the first modulation signal generator and the first power supply configured to de-modulate voltage signals output from the first power supply; and
      a first integrator:
         coupled to the first de-modulator and the first adder; and
         configured to define a voltage gain step for the first input voltage; and
   a controller configured to, during a first power cycle:
      trigger the first modulation signal generator to modulate a voltage gain of the first input voltage, by a first modulation signal of a first phase and a first frequency, to induce a first oscillating power signal output from the first power supply;
      generate a first de-modulated signal at the first de-modulator based on the first oscillating power signal and the first modulation signal;
      interpret a first voltage power point condition for the first input voltage based on the first de-modulated signal; and
      modify the voltage gain of the first power supply by a first voltage gain step based on the first power point condition and in response to the first input voltage deviating from a maximum power point voltage for the first set of solar substrings.

2. The system of claim 1, wherein the controller is configured to, during the first power cycle:
   generate a first de-modulated power signal based on a product of the first oscillating power signal from the first power supply and the first modulation signal;
   extract a DC component from the first de-modulated power signal;
   interpret the first input voltage falling below the maximum power point voltage in response to detecting a positive value for the first DC component of the first de-modulated power signal;
   apply the first integrator to the DC component to define a positive voltage gain step for the first input voltage; and
   trigger the first adder to apply the positive voltage gain step at the gain control for the first power supply to increase the first input voltage toward the maximum power point voltage.

3. The system of claim 2:
   wherein the first modulation signal generator outputs a first modulation signal defining a first sine wave and configured to induce output of a first sinusoidal power signal, at the first phase and the first frequency, from the first power supply; and
   wherein the controller is configured to generate the first de-modulated power signal based on a product of the first sinusoidal power signal from the first power supply and the sine wave, the first de-modulated power signal comprising the DC component and an AC component.

4. The system of claim 1, wherein the controller is configured to, during the first power cycle:

generate a first de-modulated power signal based on a product of the first oscillating power signal from the first power supply and the first modulation signal;
extract a DC component from the first de-modulated power signal;
interpret the first input voltage above the maximum power point voltage in response to detecting a negative value for the first DC component of the first de-modulated power signals;
apply the first integrator to the DC component to define a negative voltage gain step for the first input voltage; and
trigger the first adder to apply the negative voltage gain step at the gain control for the first power supply to decrease the first input voltage toward the maximum power point voltage.

5. The system of claim 1, wherein the controller is configured to, during the first power cycle:
generate a first de-modulated power signal based on a product of the first oscillating power signal from the first power supply and the first modulation signal;
interpret the first input voltage matching the maximum power point voltage in response to detecting absence of a DC component in the first de-modulated power signal; and
trigger the first adder to apply a null voltage gain step at the gain control for the first power supply in response to the first input voltage matching the maximum power point voltage.

6. The system of claim 1:
wherein the first set of solar substrings comprises a first solar substring and a second solar substring arranged in series;
wherein the first power regulator is coupled to a voltage output of the first solar substring; and
further comprising a second power regulator:
defining:
an output coupled to a midpoint voltage between the first solar substring and the second solar substring; and
an input coupled to the voltage output of the first solar substring; and
comprising:
a second power supply configured to receive the first input voltage generated by the set of solar substrings;
a second modulation signal generator:
coupled to a second gain control of the second power supply;
generating a second modulation signal of a second phase and a second frequency, different from the first phase and the first frequency, of the first modulation signal; and
configured to induce a second oscillating power signal output from the second power supply;
a second de-modulator:
coupled to the second modulation signal generator and the first power supply; and
configured to generate a second de-modulated power signal based on the first oscillating power signal and the first modulation signal; and
a second integrator:
coupled to the second gain control of the second power supply and the second de-modulator; and
defining a second voltage gain step for the voltage midpoint based on the second de-modulated power signal.

7. The system of claim 6, wherein the controller is configured to:
during the first power cycle:
generate a first de-modulated power signal based on a product of the first oscillating power signal from the first power supply and the first modulation signal;
extract a first DC component from the first de-modulated power signal;
interpret the first input voltage falling below the maximum power point voltage in response to detecting a positive value for the first DC component in the first de-modulated power signal; and
trigger the first adder to apply a positive voltage gain step at the gain control for the first power supply to increase the first input voltage toward the maximum power point voltage in response to interpreting the first input voltage falling below the maximum power point voltage; and
during a second power cycle, following the first power cycle:
generate a second de-modulated power signal based on a product of the first oscillating power signal from the first power supply and the second modulation signal;
extract a second DC component from the second de-modulated power signal;
interpret the first input voltage above the maximum power point voltage in response to detecting a negative value for the first DC component in the second de-modulated power signal; and
trigger the second adder to apply a negative voltage gain step at the gain control for the second power supply to decrease the midpoint voltage in response to interpreting the first input voltage falling below the maximum power point voltage.

8. The system of claim 6, wherein the controller is configured to:
during the first power cycle:
generate a first de-modulated power signal based on a product of the first oscillating power signal from the first power supply and the first modulation signal;
extract a first DC component from the first de-modulated power signal;
interpret the first input voltage above the maximum power point voltage in response to detecting a negative value for the first DC component in the first de-modulated power signal; and
trigger the first adder to apply a negative voltage gain step at the gain control for the first power supply to decrease the first input voltage toward the maximum power point voltage in response to interpreting the first input voltage falling below the maximum power point voltage; and
during the second power cycle, following the first power cycle:
generate a second de-modulated power signal based on a product of the first oscillating power signal from the first power supply and the second modulation signal;
interpret the first input voltage matching the maximum power point voltage in response to detecting absence of a second DC component in the second de-modulated power signal; and trigger the second adder to apply a null voltage gain step at the second gain control for the second power supply in response to the first input voltage matching the maximum power point voltage.

9. The system of claim 6:
wherein the first modulation signal generator outputs a first modulation signal defining a first sine wave and configured to induce output of a first sinusoidal power signal, at the first phase and the first frequency, from the first power supply; and
wherein the second modulation signal generator:
  outputs a second modulation signal defining a second sine wave of a second frequency offset 20 Hertz from the first frequency; and
  is configured to induce output of a second sinusoidal power signal, at the second phase and the second frequency, from the second power supply.

10. The system of claim 1 further comprising a low-pass filter:
coupled to an input of the first integrator and an output of the first de-modulator;
defining a low-pass cutoff frequency greater than the first frequency of the first modulation signal; and
configured to deliver a DC component of a first de-modulated signal output from the first de-modulator to the first integrator.

11. The system of claim 1:
further comprising a solar panel:
  comprising the set of solar substrings; and
  defining a front face and a rear face;
further comprising a housing:
  arranged on the rear face of the solar panel; and
  comprising the first power regulator and the controller arranged within a cavity of the housing.

12. The system of claim 1, further comprising a band pass filter:
coupled to the output of the first power supply and the input of the first de-modulator;
defining:
  a high-pass cutoff frequency greater than the first frequency of the first modulation signal; and
  a low-pass cutoff frequency less than the first frequency of the first modulation signal and configured to block a DC component of the first modulation signal; and
configured to deliver an AC component of the first modulation signal to the first de-modulator.

* * * * *